Nov. 16, 1954   A. M. SMITH, SR., ET AL   2,694,318
TELESCOPING MOTOR VEHICLE BRAKE PEDAL HOLDER
Filed Sept. 16, 1952
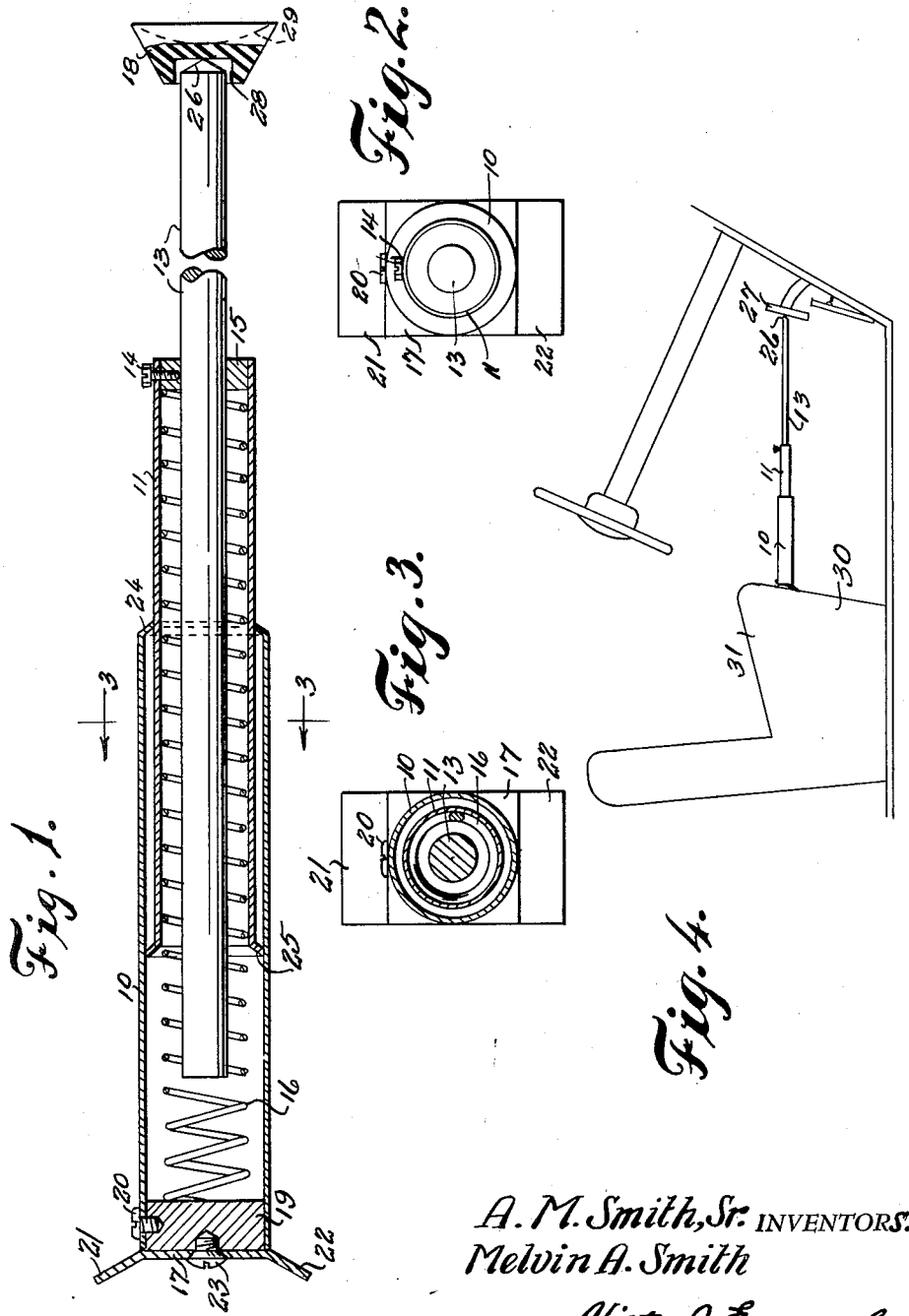
A. M. Smith, Sr.
Melvin A. Smith
INVENTORS.
BY Victor J. Evans & Co.
ATTORNEYS United States Patent Office 2,694,318
Patented Nov. 16, 1954

2,694,318

TELESCOPING MOTOR VEHICLE BRAKE PEDAL HOLDER

Arthur M. Smith, Sr., and Melvin A. Smith, Boise, Idaho

Application September 16, 1952, Serial No. 309,804

1 Claim. (Cl. 74—532)

This invention relates to devices used in motor vehicles to facilitate the operation thereof, and in particular a spring actuated telescoping holder which, with the base positioned against the front wall of the front seat of a motor vehicle and with the extended end positioned against the brake pedal the brake of the vehicle will be applied while the operator is changing a tire or otherwise engaged.

The purpose of this invention is to provide a brake holding device that is adapted to be used for holding a brake of a motor vehicle in an emergency or wherein the operator of the vehicle is indisposed.

It is common knowledge that in numerous instances motor vehicles are driven with the emergency brake applied and for this reason many emergency brakes are not effective. There are also instances when, even though the emergency brake is adapted to hold the vehicle, it is desirable to use an additional brake, such as in changing a tire on a hill or incline. With this thought in mind this invention contemplates a holder or support having a rod adjustably mounted in telescoping tubes with means for holding the extended end of the rod on the brake pedal of a motor vehicle with the base of the telescoping tubes positioned against the forward wall of the front seat of the vehicle.

The object of this invention is, therefore, to provide means for forming a telescoping holder wherein the parts are extended by a spring positioned in the holder and wherein the device is adapted to hold the brake pedal of a motor vehicle with the brake set or applied.

Another object of the invention is to provide a holder for a brake pedal of a motor vehicle that is adapted to be used in vehicles now in use without changing parts of the vehicle.

A further object of the invention is to provide a telescoping holder for a brake pedal of a motor vehicle in which the holder is of a simple and economical construction.

With these and other objects and advantages in view the invention embodies a tubular base having temporary attaching elements on one end, a telescoping tube slidably mounted in the base and having a disc mounted in the outer end, a spring extended through the tube for urging the telescoping tube outwardly of the base, and a rod with pedal engaging means on the outer end adjustably held in the disc and extended into the tube.

Other features and advantages of the invention will appear from the following description taken in connection with the drawing, wherein:

Figure 1 is a longitudinal section through the improved brake pedal holder with a rod extending through the intermediate part thereof shown in elevation and with part of the rod broken away.

Figure 2 is an end elevational view of the holder with a vacuum cup on the extended end of a rod extended from the base omitted.

Figure 3 is a cross section through the holder taken on line 3—3 of Fig. 1.

Figure 4 is an elevational view showing part of a motor vehicle illustrating the position of the device of this invention with the base positioned against the forward wall of the front seat of the vehicle and with the extended end of a rod of the device in engagement with a foot pedal of the brake of the vehicle.

Referring now to the drawing wherein like reference characters denote corresponding parts the improved brake pedal holder of this invention includes a tubular base 10, a telescoping tube 11 extended from the base and slidably mounted therein, a rod 13 extended through the center of the base and tube 11 and adjustably mounted by a set screw 14 in a disc 15 in the outer end of the tube 11, a spring 16 for urging the parts to extended positions, a mounting plate 17 carried by the base 10 and a vacuum cup 18 adapted to be positioned on the outer end of the rod 13.

The tubular base 10 is provided with a plug 19 which is secured in position with a set screw 20. The mounting plate 17, which is provided with angularly disposed end sections 21 and 22, is secured to the plug 19 with a screw 23. The extended end of the tubular base 10 is provided with an annular flange 24 in which the telescoping tube 11 is slidably held and the inner end of the tube 11 is provided with an outwardly extended flange 25 which coacts with the flange 24 to retain the telescoping members in alignment and which also prevents accidental separation of the members.

The spring 16 is positioned with one end against the plug 19 and with the opposite end bearing against the disc 15 whereby with the rod 13 secured in the disc 15 with the set screw 14 the rod is resiliently urged outwardly with a point 26 on the extended end positioned to engage the surface of a foot pedal 27 of the brake of the vehicle.

In some instances such as where the brake pedal is provided with a smooth surface and where the surface is substantially vertical a vacuum cup, as indicated by the numeral 18 may be used between the end of the rod 13 and pedal for retaining the end of the rod in position on the pedal. The vacuum cup 18 is provided with a recess 28 into which the end of the rod 13 extends and the opposite face of the cup is provided with an arcuate recess 29.

With the parts arranged in this manner the brake pedal holder of this invention may be carried below the seat or in the trunk of a vehicle and when it is desired to hold the brake pedal in the position of holding the brakes the device is positioned as illustrated in Fig. 4 with the plate 17 on the tubular base 10 positioned against the forward wall 30 of a seat as indicated by the numeral 31. The opposite end of the device or pointed end of the rod 13 is positioned against the foot pedal of the brake and the point may be positioned directly against the pedal or a vacuum cup may be used for retaining the point in position on the pedal as may be desired. With the pedal held in this manner the operator may have the assurance that the brake will remain in the holding position whereby a tire may be changed or other parts of the vehicle repaired or adjusted without danger of the vehicle rolling away from the position in which it is located.

It will be understood that modifications, within the scope of the appended claim, may be made in the design and arrangement of the parts without departing from the spirit of the invention.

What is claimed is:

In a motor vehicle brake pedal holder, the combination which comprises a tubular base having an inwardly extended flange in one end, a plug secured in the opposite end of the tubular base, a mounting plate having angularly positioned sections forming the ends thereof mounted on said plug, a telescoping tube having an outwardly extended annular flange on one end extended through the annular flange of the tubular base with the outwardly extended flange in the base, a disc secured in the extended end of the telescoping tube, a rod extended through the disc of the telescoping tube, means clamping the rod in adjusted positions in said disc, and means on the outer end of the rod for retaining the rod in position on a brake pedal of a motor vehicle.

References Cited in the file of this patent

UNITED STATES PATENTS

| Number | Name | Date |
|---|---|---|
| 554,686 | Harris et al. | Feb. 18, 1896 |
| 1,681,192 | McBride | Aug. 21, 1928 |
| 1,707,113 | Christ | Mar. 26, 1929 |
| 1,721,227 | Manley | July 16, 1929 |
| 1,877,367 | Seppman | Sept. 13, 1932 |
| 2,253,850 | Fisher | Aug. 26, 1941 |